United States Patent [19]
Chalmers et al.

[11] 3,967,184
[45] June 29, 1976

[54] ELECTRICAL INVERTER CIRCUIT

[75] Inventors: Brian John Chalmers, Bramhall; John Philip Gibson, Longsight, both of England

[73] Assignee: C.A.V. Limited, Birmingham, England

[22] Filed: Dec. 24, 1974

[21] Appl. No.: 536,157

[30] Foreign Application Priority Data
Dec. 22, 1973 United Kingdom.............. 3370/73

[52] U.S. Cl.............................................. 321/45 C
[51] Int. Cl.².................................... H02M 7/515
[58] Field of Search.............. 321/45 C; 307/252 M

[56] References Cited
UNITED STATES PATENTS

| | | | |
|---|---|---|---|
| 3,278,827 | 10/1966 | Corey et al. | 321/45 C |
| 3,286,155 | 11/1966 | Corey | 321/45 C |
| 3,311,809 | 3/1967 | Corey et al. | 321/45 C |
| 3,331,011 | 7/1967 | Landis | 321/45 C |
| 3,487,278 | 12/1969 | Turnbull et al. | 321/45 C |
| 3,588,542 | 6/1971 | Knapp | 307/252 M |

OTHER PUBLICATIONS
*Electric Machinery*, A. E. Fitzgerald & Charles Kingsley, Jr., McGraw-Hill Book, Company, Inc., New York, p. 663, 1952.

*Primary Examiner*—William M. Shoop

[57] ABSTRACT

An electrical inverter comprises positive and negative supply lines across which is connected a first series circuit including the anode-cathode path of a first thyristor and the anode-cathode path of a second thyristor. A second series circuit bridges the supply lines and includes a pair of capacitors. In addition a commutating circuit is provided for the first and second thyristors, and this includes a transformer having a secondary winding connected between a point intermediate the first and second thyristors, and the capacitors of the second series circuit, and the primary winding of the transformer is connected in a series circuit, one end of which is connected to the point intermediate the first and second thyristors. The arrangement is such that when the commutating circuit is operated, current flow in the primary and secondary windings of the transformer acts to reduce the current flowing in the conducting thyristor to zero.

5 Claims, 2 Drawing Figures

ELECTRICAL INVERTER CIRCUIT

This invention relates to inverters.

An inverter according to the invention comprises in combination positive and negative supply lines, a first series circuit bridging the positive and negative supply lines and including the anode-cathode path of a first thyristor and the anode-cathode path of a second thyristor, a second series circuit bridging the first and second supply lines and including a pair of capacitors, and a commutating circuit for the first and second thyristors, said commutating circuit including a transformer having its secondary winding included in a connection between a point in the first series circuit intermediate the first and second thyristors, and a point in the second series circuit intermediate the pair of capacitors, the primary winding of the transformer being connected in a series circuit one end of which is connected to said point in the first series circuit, whereby when said commutating circuit is operated current flow in the primary and secondary windings acts to reduce the current flowing in the conducting thyristor to zero.

Preferably, the transformer is an auto-transformer.

In the accompanying drawings.

Figure 1:
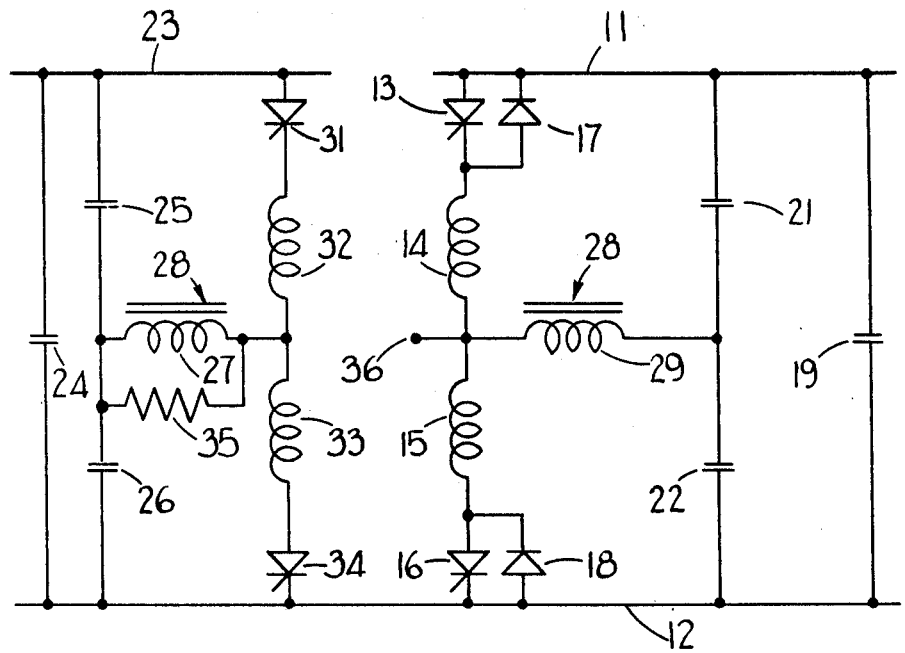
FIG. 1 is a circuit diagram of a known inverter.

Referring first to FIG. 1, there are provided positive and negative supply lines 11, 12, between which is connected a series circuit including the anode-cathode path of a thyristor 13, an inductor 14, an inductor 15 and the anode-cathode path of a thyristor 16. The thyristor 13 is bridged by a diode 17 with its cathode connected to the line 11 and the thyristor 16 is bridged by a diode 18 with its anode connected to the line 12. The lines 11, 12 are bridged by a capacitor 19 and by a pair of capacitors 21, 22 in series.

There is further provided a positive supply line 23, the lines 23, 12 being bridged by a capacitor 24 and by a pair of capacitors 25, 26 in series. The junction of the capacitors 25, 26 is connected to one end of the primary winding 27 of a transformer 28, the secondary winding 29 of the transformer 28 having one end connected to the junction of the inductors 14, 15 and its other end connected to the junction of the capacitors 21, 22. The lines 23, 12 are bridged by a series circuit including the anode-cathode path of a thyristor 31, an inductor 32, an inductor 33 and the anode-cathode path of a thyristor 34, and the junction of the inductors 32, 33 is connected to the other end of the winding 27. The winding 27 is bridged by a resistor 35. Conveniently the voltage between the supply lines 23 and 12 is higher than that between supply lines 11 and 12.

The arrangement thus far described is known. The junction of the inductors 14, 15 is connected to a terminal 36 for connection to a load, and the voltage between the lines 23, 12 is substantially constant, although the voltage between the lines 11, 12 can be varied. The thyristors 13, 16 and their associated components form a square wave inverter, and the thyristors 31, 34 and their associated components form a secondary inverter for commutating the thyristors 13, 16. Thus, assuming that the thyristor 13 is conducting, then at some point in the cycle the thyristor 31 is fired and current flows from right to left through the winding 27, generating current flow in the winding 29. The winding 29 now feeds the load, and so the current contributed by the thyristor 13 decreases until a point is reached at which the thyristor 13 no longer conducts. Current now flows through the diode 17 from the winding 29, as well as into the load, and the thyristor 13 is reversed biased and turns off. The thyristor 31 turns off as a result of current flow through the winding 27 decreasing to zero. The capacitors 21, 22 provide the required return path for the current flow through the transformer secondary 29. The thyristor 16 can now be fired, and later the thyristor 16 is turned off by firing of the thyristor 34.

Figure 2:
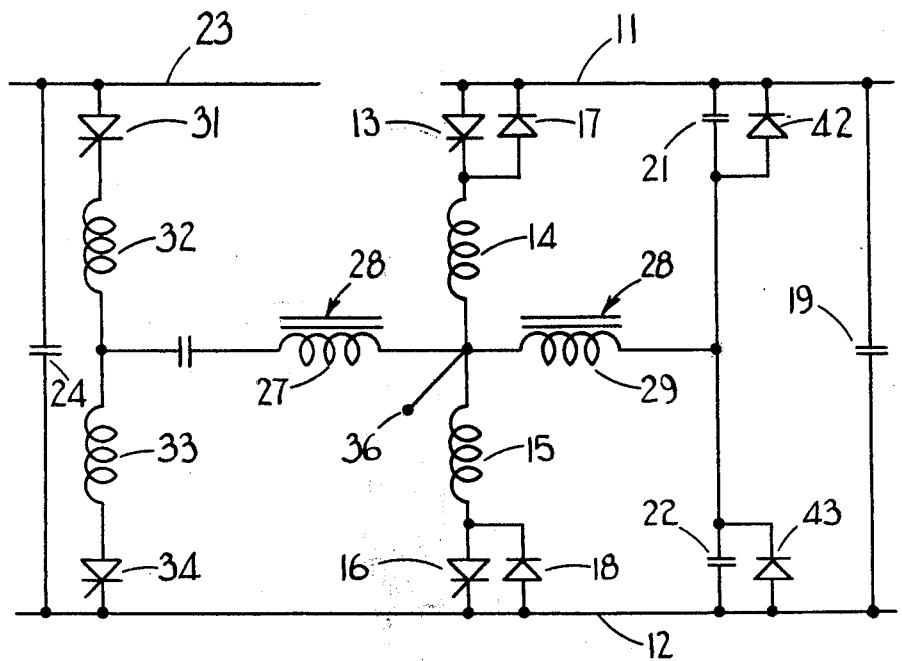
FIG. 2 is a circuit diagram similar to FIG. 1 illustrating one example of the invention.

Referring now to FIG. 2, there is shown one example of the invention. Instead of the transformer used in FIG. 1, an auto-transformer 28 is used, so that the end of the winding 27 previously connected to the junction of the capacitors 25, 26 is connected to the junction of the inductors 14, 15 and the winding 29. The capacitors 25, 26 are now replaced by a single capacitor 41 connecting the other end of the winding 27 to the junction of the inductors 32, 33. Additionally, the resistor 35 is omitted and diodes 42, 43 are connected across the capacitors 21, 22 respectively.

The operation is similar to that described with reference to FIG. 1, except that when the thyristor 31 is fired to commutate the thyristor 13, current now flows through the thyristor 31, the inductor 32, the capacitor 41, the winding 27, the inductor 14 and the diode 17. The reduction in current flowing through the thyristor 13 now results from the combined current flowing through the windings 27 and 29, and so compared with the arrangement shown in FIG. 1, less current is required in the winding 29. It will be appreciated of course that when the thyristor 34 is fired, the combined current through the windings 27 and 29 commutates the thyristor 16.

The diodes 42 and 43 utilized in the circuit of FIG. 2 have the advantage over the resistor 35 shown in FIG. 1 of reducing the time required to reset the transformer and the capacitors 21 and 22. Moreover, as the resistor is omitted, the power loss in the circuit is also reduced.

As compared with the circuit of FIG. 1, the circuit of FIG. 2, has the advantage that the capacitors 19, 21, 22 can be smaller and where, as is preferred in the arrangement of FIG. 2, the transformer 28 is a voltage step-down transformer, the turns ratio can be lower than in the arrangement of FIG. 1, because the current which needs to be contributed by the winding 29 is reduced.

In a modification, the positions of the capacitor 41 and winding 27 are reversed. The transformer is not now an autotransformer, but the circuit works in exactly the same way and has the same advantages as FIG. 2.

We claim:

1. An electrical inverter comprising in combination positive and negative supply lines, a first series circuit bridging the positive and negative supply lines and including the anode-cathode path of a first thyristor and the anode-cathode path of a second thyristor, a second series circuit bridging the first and second supply lines and including a pair of capacitors, and a commutating circuit for the first and second thyristors, said commutating circuit including a transformer having its secondary winding included in a connection between a point in the first series circuit intermediate the first and second thyristors, and a point in the second series circuit intermediate the pair of capacitors, the primary winding of the transformer being connected in a series circuit one end of which is connected to said point in the first series circuit whereby when said commutating circuit is operated, current flow in the primary and secondary windings acts to reduce the current flowing in the conducting thyristor to zero.

2. An inverter as claimed in claim 1 including a capacitor in series with the primary winding of the transformer.

3. An inverter as claimed in claim 2 in which the other end of the series circuit which includes the primary winding is connected to a point intermediate a further pair of series connected thyristors, said further pair of thyristors being connected between positive and negative supply rails, the thyristor of the further pair of thyristors whose anode is connected to the positive supply rail being fired to cause turning off of said first thyristor.

4. An inverter as claimed in claim 3 in which said tranformer is an auto transformer.

5. An inverter as claimed in claim 3 including a pair of diodes connected in parallel with the capacitors of said second series circuit respectively.

* * * * *